(12) United States Patent
Heyse

(10) Patent No.: US 6,963,798 B2
(45) Date of Patent: Nov. 8, 2005

(54) METHOD AND ARRANGEMENT FOR INFLUENCING A VEHICLE IN DEPENDENCE UPON A TRAVEL PATH

(75) Inventor: Joerg Heyse, Bietigheim (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 10/467,830

(22) PCT Filed: Oct. 25, 2002

(86) PCT No.: PCT/DE02/04011

§ 371 (c)(1),
(2), (4) Date: Aug. 13, 2003

(87) PCT Pub. No.: WO03/051662

PCT Pub. Date: Jun. 26, 2003

(65) Prior Publication Data

US 2004/0210375 A1    Oct. 21, 2004

(30) Foreign Application Priority Data

Dec. 14, 2001    (DE) .............................. 101 61 532

(51) Int. Cl.⁷ .............................................. B60K 31/00
(52) U.S. Cl. .......................... 701/93; 701/96; 701/211; 340/903

(58) Field of Search .............................. 701/93, 96, 35, 701/201, 202, 207, 213, 211, 300, 301; 340/903, 340/905, 995.23, 995.27, 995.28, 436; 342/357.07, 342/357.08, 357.013

(56) References Cited

U.S. PATENT DOCUMENTS

| | | | | |
|---|---|---|---|---|
| 4,166,514 A | * | 9/1979 | de Freminville et al. ... 180/167 |
| 5,485,161 A | * | 1/1996 | Vaughn .................. 342/357.13 |
| 5,521,823 A | | 5/1996 | Hirabayashi et al. ......... 701/36 |
| 5,546,311 A | * | 8/1996 | Sekine ....................... 701/208 |
| 6,087,965 A | * | 7/2000 | Murphy ...................... 340/991 |
| 6,161,072 A | | 12/2000 | Clapper ....................... 701/93 |
| 6,246,948 B1 | * | 6/2001 | Thakker ...................... 701/93 |
| 6,591,188 B1 | * | 7/2003 | Ohler .......................... 701/209 |
| 6,756,887 B2 | * | 6/2004 | Evans ......................... 340/436 |

FOREIGN PATENT DOCUMENTS

DE    298 20 659    4/1999

* cited by examiner

*Primary Examiner*—Tan Q. Nguyen
(74) *Attorney, Agent, or Firm*—Walter Ottesen

(57) ABSTRACT

A method and an arrangement for influencing a vehicle in dependence upon travel paths are suggested. A travel path on which an automatic vehicle influencing is intended to take place can be programmed and when this travel path is traveled by the vehicle, the automatic influencing of the vehicle takes place.

13 Claims, 3 Drawing Sheets

METHOD AND ARRANGEMENT FOR INFLUENCING A VEHICLE IN DEPENDENCE UPON A TRAVEL PATH

RELATED APPLICATIONS

This application is the national stage of international application PCT/DE 02/04011, filed Oct. 25, 2002, designating the United States and claiming priority from German patent application no. 101 61 532.9, filed Dec. 14, 2001, the entire content of which is incorporated herein by reference.

The invention relates to a method and arrangement for influencing a vehicle in dependence upon travel path.

FIELD OF THE INVENTION

The invention relates to a method and arrangement for influencing a vehicle in dependence upon travel distance.

BACKGROUND OF THE INVENTION

Equipping vehicles with means for detecting the geographic position of the vehicle (for example, GPS receiver) is on the increase. The main area of application is the use of the geographic position information in combination with navigation systems. An individual influencing of the vehicle functions on the basis of such position information is not provided in such systems.

SUMMARY OF THE INVENTION

With the procedure according to the invention, the input of a defined travel path segment, for example, by the driver is made possible so that a targeted influencing of a vehicle function (for example, a limiting of road speed) is carried out when the defined travel path segment is travel over.

Special advantages result with the application of this procedure in combination with an automatic travel speed limiter. In this way, the driver has the possibility of inputting travel paths on which the speed is automatically limited. In this way, the driver can freely program paths which the driver travels often and on which the speed is limited. Upon entry into the predetermined path segment, an automatic limiting of the vehicle speed takes place to a likewise pregivable maximum speed assigned to the path segment.

It is especially advantageous that, via a simple teach-in-method, the programming of the travel path, the programming of the speed limiting as well as the limit speed assigned thereto can take place during the trip. In an especially advantageous manner, existing operator-controlled elements of the vehicle speed controller or vehicle speed limiter are used.

In an advantageous manner, the automatic speed limiting can be deactivated at any time, with active limiting, for example, in that the driver actuates the accelerator pedal fully (kick-down switch) or generally via an on/off switch.

An especially advantageous supplement is that fixed pregiven speed limits can be received, loaded and changed at defined travel path segments, such as in cities, for specific regions, et cetera, by means of a regular update.

In an advantageous manner, the travel direction of the vehicle is detected so that the vehicle speed limiting can be inputted on a travel path selected by the driver also in dependence upon direction so that a speed limiting in this travel direction is undertaken and not in the opposite direction. Furthermore, it is in this way ensured in an advantageous manner that a possibly programmed speed limiting is not undertaken when the vehicle, for example, moves on an intersection transversely to the programmed travel direction.

In an advantageous manner, the average usual reaction time of the driver is considered when programming in the speed limiting during the travel. This means that the position coordinate starting at which the automatic speed limiting begins when again driving the segment is that position coordinate at the time point of programming less the reaction distance derived from reaction time and speed.

In an advantageous manner, the path segment for influencing the vehicle, which is programmed in by the driver, is not only used in combination with a travel speed limiter but also in a supplemental manner or alternatively, with other functions such as: the activation of driver assistance systems such as an adaptive travel speed controller (ACC), et cetera; the switching on of the illumination of the vehicle; or, for the adjustment of the chassis characteristics (sporty, comfortable); or, for remote diagnosis, remote maintenance and/or vehicle intervention (for example, enablement and activation of data connections on predetermined segment sections).

Further advantages will become evident from the following description of embodiments.

DESCRIPTION OF THE PREFERRED EMBODIMENTS OF THE INVENTION

Figure 1:
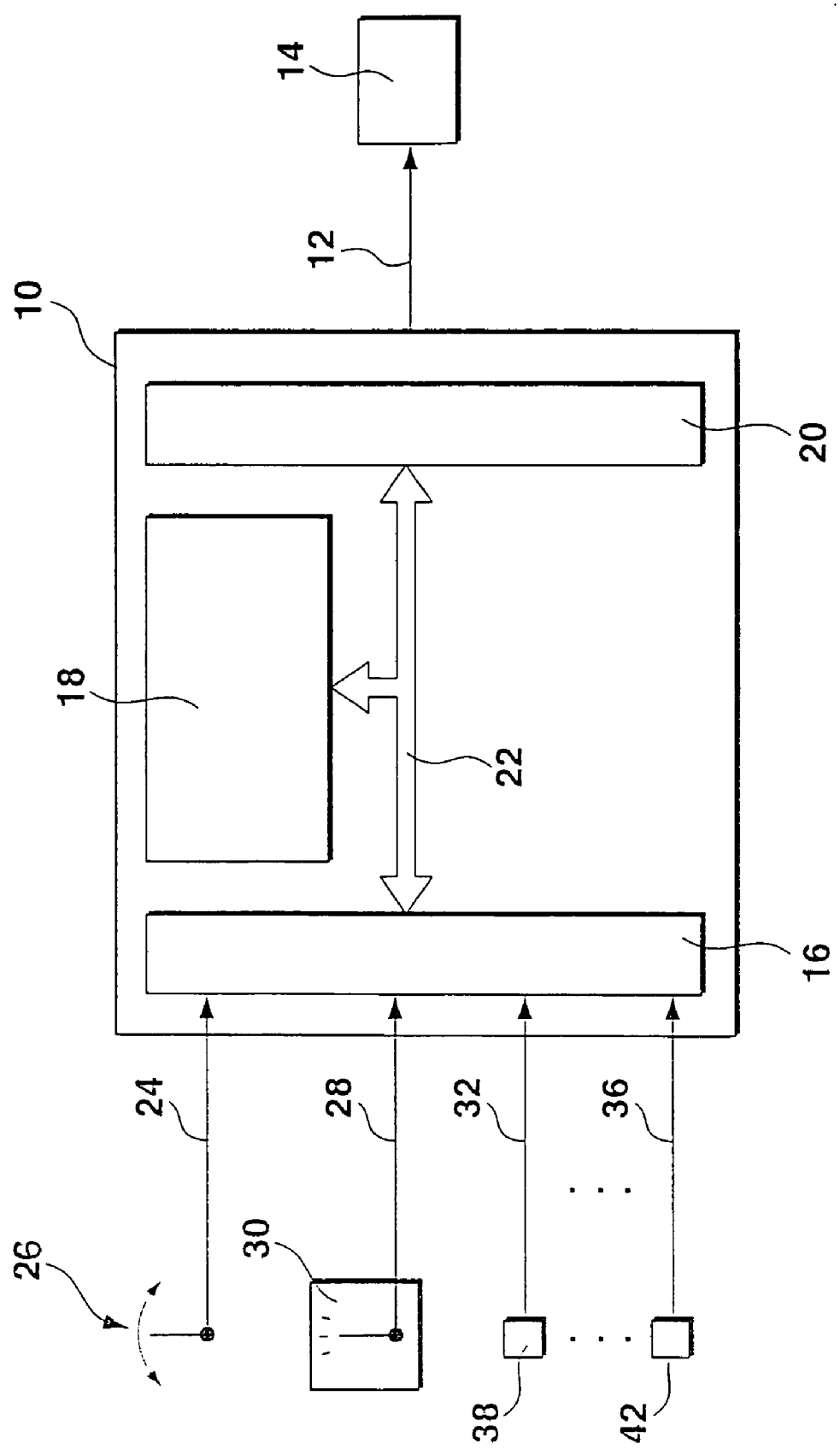
FIG. 1 shows an arrangement for carrying out the procedure shown hereinafter. This procedure is shown in greater detail on a preferred embodiment in the context of the sequence diagrams of FIGS. 2 and 3.

FIG. 1 shows an electronic control unit 10 which actuates at least one actuating device 14, which influences the vehicle, via at least one output line 12. The control unit includes essentially an input circuit 16, at least one microcomputer 18 as well as an output circuit 20. Input circuit 16, output circuit 20 and microcomputer 18 are interconnected for communication via a bus system. Depending upon the configuration of the control unit, different input quantities are supplied to the input circuit 16. The input circuit 16 is connected at least via an input line 24 to an operator-controlled element 26 actuable by the driver. The operator-controlled element 26 is, for example, the operator-controlled unit of a tempomat (automatic speed controller) or a travel speed limiter with which the driver transmits command signals to the control unit 10 or the input circuit 16 is connected to another input unit (for example, an external computer, special operator-controlled elements for the procedure described hereinafter or operator-controlled elements/keys of a navigation system). The input circuit 16 is further connected to a unit 30 via an input line 28. The unit 30 transmits data with respect to the instantaneous position of the vehicle. These data could be GPS signals or prepared position coordinates. Furthermore, input lines 32 to 36 are provided which supply vehicle-specific quantities to the control unit 10 from measuring devices 38 to 42. These vehicle-specific quantities can, for example, be the wheel speeds, vehicle speed, et cetera.

Depending upon the embodiment, the control unit 10 is a navigation system, a central vehicle control unit, a control unit for a vehicle speed controller and/or vehicle speed limiter, an engine control unit, et cetera.

In the following, the operation of the procedure of the invention is given based on the preferred embodiment of an automatic vehicle speed limiter on travel path segments defined by the driver. Here, it is provided that the driver triggers the programming operation during travel over a path segment by actuating an operator-controlled element, for example, the speed set key on the tempomat operator-controlled lever or a separate key. The instantaneously driven speed is inputted as the limit speed and, additionally, the position coordinate at the location at which the programming operation was triggered is stored. The programming is ended at the end of the travel path intended by the driver, for example, via actuating the same or another operator controlled element or by pressing the accelerator pedal. The instantaneous position coordinate, which is present at the end of the programming operation, is likewise stored. When the path is traveled over again, that is, when reaching the position coordinate, which indicates the start of the speed-limiting distance, an automatic speed limiting is initiated; whereas, when. reaching the position coordinate, which indicates the end of the travel path, the speed limiting is automatically disabled. The programming mode is displayed to the driver, for example, via a text information or a warning lamp in the display or via an audio output as is the travel of a programmed travel path (here, together with the limit speed).

If the programming operation is triggered anew for a renewed travel of an already programmed path, then the previous programming is completely erased, that is, also when parts of the earlier programmed path lie outside of the newly-programmed path.

While driving through the travel path pregiven by the driver, the speed of the vehicle is limited to the programmed-in limit speed, that is, the vehicle travels at any desired speed wanted by the driver below the limit speed; whereas, speeds above the limit speed are not permitted. A disablement of the automatic limiting is possible also during the travel on this travel path, for example, in that the driver presses down hard on the accelerator pedal, especially completely. In this way, by closing the so-called kick-down switch, for example, the speed limiting is disabled and the driver is empowered to accelerate the vehicle to speeds which are greater than the pregiven limit speed which is programmed in for this path segment.

A supplement provides that as vehicle position at which the automatic speed limit starts, a position is stored which lies ahead of the position at which the driver has started with the programming. In this way, the reaction time of the driver is considered. In this way, when driving the path again with a programmed speed limiting, the speed limiting is timely activated. The position coordinate, which leads to the triggering of the automatic speed limiting, is computed from the position coordinate at which the driver starts the programming operation and a distance which is derived from the vehicle speed and the average reaction time of the driver.

In the preferred embodiment, the position coordinates are derived directly from GPS signals. In other embodiments, these signals are supplied already prepared by other systems, for example, a navigation system.

Depending upon the embodiment, the speed present at the start of the programming operation is stored as the limit speed or, for a further deceleration of the vehicle directly after the start of the programming, that speed is stored at which the deceleration operation is ended.

If the vehicle travels at a vehicle speed greater than the limit speed and if the vehicle travels into a driving distance region pregiven by the driver, then the speed of the vehicle is automatically controlled for a time, for example, by reducing the engine torque up to generating the maximum engine drag torque and/or by intervention at the wheel brakes. In the preferred embodiment, a desired deceleration value is inputted which is converted into an engine torque or into a brake torque for controlling the engine and/or the brake system. In this way, a smooth, comfortable transition is sought without, however, driving too long in the limited region at too high a speed.

The programming of the travel path on which a speed limiting is to take place, is undertaken by the driver as described above by actuating at least one operator-controlled element during travel of the path. The travel distance coordinates are then directly stored, for example, in the navigation system on a memory (for example, an ROM). Depending upon the embodiment, the operator-controlled elements are: tempomat (automatic speed controller) keys which are present or the vehicle speed limiting keys, separate operator-controlled elements or voice detection (driver commands) or at least one operator-controlled key of a navigation system. With the aid of such an operator-controlled element, a selective switching on and switching off of the system is also made available so that the driver has the possibility to completely disable or switch out the influencing of the vehicle in dependence upon the travel path.

In an advantageous embodiment, the programming by the driver is not only undertaken when driving over the particular travel path but also via programming the navigation system itself in that the speed limiting (start, end, limit value, if required, direction) is programmed in during virtual driving over the path. In an especially advantageous embodiment, this can take place also via an external computer which is connected to the navigation system via a data connection. In this way, a travel path can be pregiven (by the driver, service center personnel, et cetera or by the computer of a service center) for remote maintenance or diagnosis and defined interventions into the vehicle control take place when driving over this travel distance.

In an advantageous manner, preprogrammed sets of data as to travel paths with speed limits are stored in the system, for example, via diskette or CD.

In a preferred embodiment, the travel direction of the vehicle is detected, for example, from a comparison of sequential position coordinates and their difference or from wheel speed signals from which the direction of rotation can be derived. Accordingly, in this embodiment, the driving direction of the vehicle is detected during the programming operation in addition to the travel path, on which a speed limit is to apply, and the limit value. In this way, it is precluded that the vehicle is braked at the same position coordinate also in the opposite travel direction or when traveling over an intersection. In the preferred embodiment, the travel direction is determined via the difference of two position coordinates which are sequentially driven over in a short time. The programmed in travel path is then assigned an identifier which represents the driving direction. A speed limiting is only undertaken when the actual driving direction of the vehicle coincides with this identifier. The programmer (for example, the driver) can select in a preferred embodiment from a function menu whether the driving direction is to be considered.

It is further provided that the usual reaction time of the driver is considered during the programming operation when traveling the corresponding travel path. A reaction distance is determined in dependence upon the driving speed of the vehicle. The position coordinate is determined starting from which the automatic speed limiting starts when again traveling the path. The position coordinate is determined from the position coordinate at the time point of programming in and the reaction distance. As a position coordinate at which the speed limiting starts, a position coordinate is stored which lies ahead of the position coordinate by the reaction distance in the driving direction with this position coordinate being where the programming-in operation had begun.

In the preferred embodiment, the programming operation and/or the limiting operation is computed in at least one control unit for the vehicle control, preferably, in the control unit of a navigation system, a central control unit of the vehicle or another control unit of the vehicle such as the engine control unit.

Figure 2:
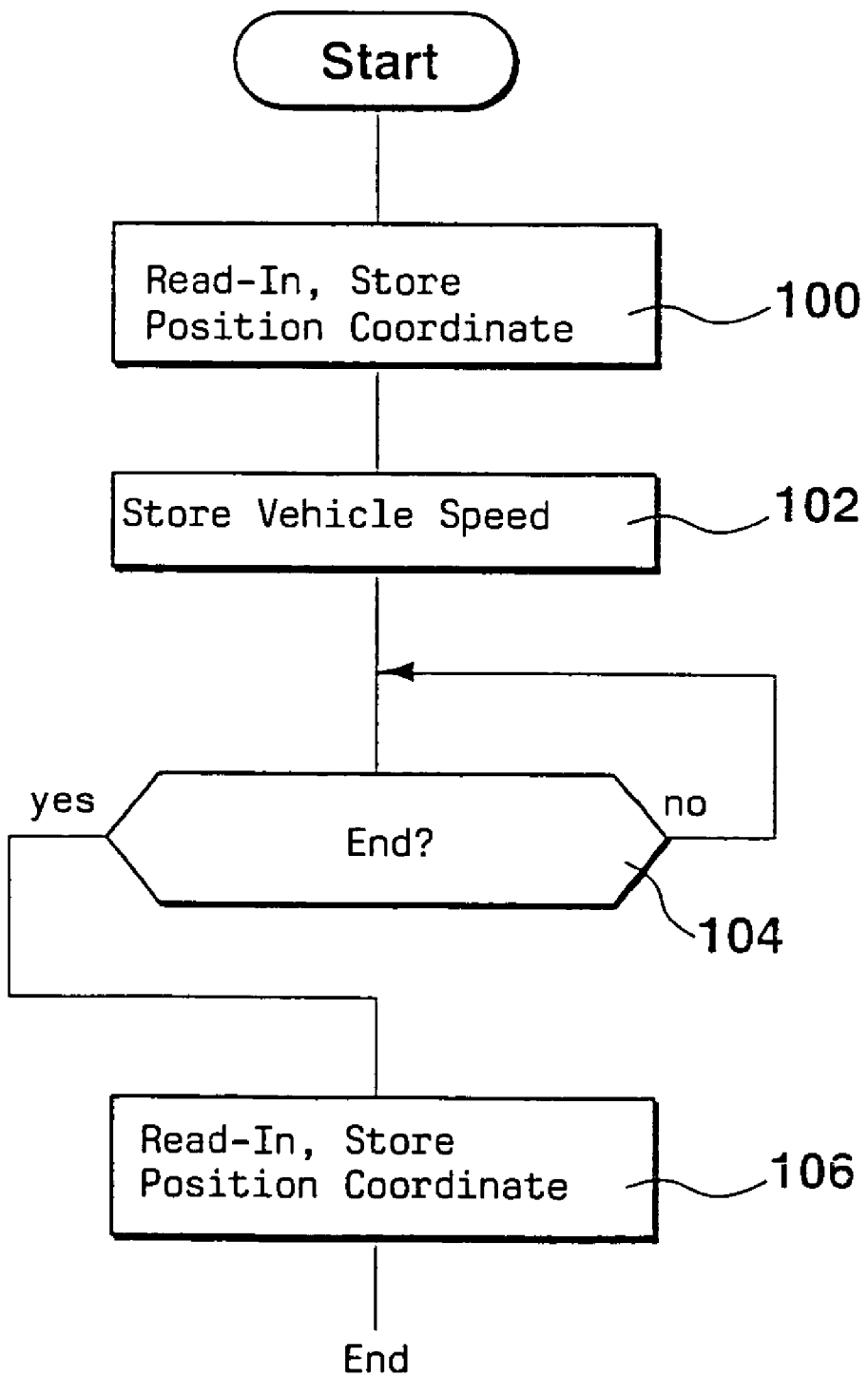
Figure 3:
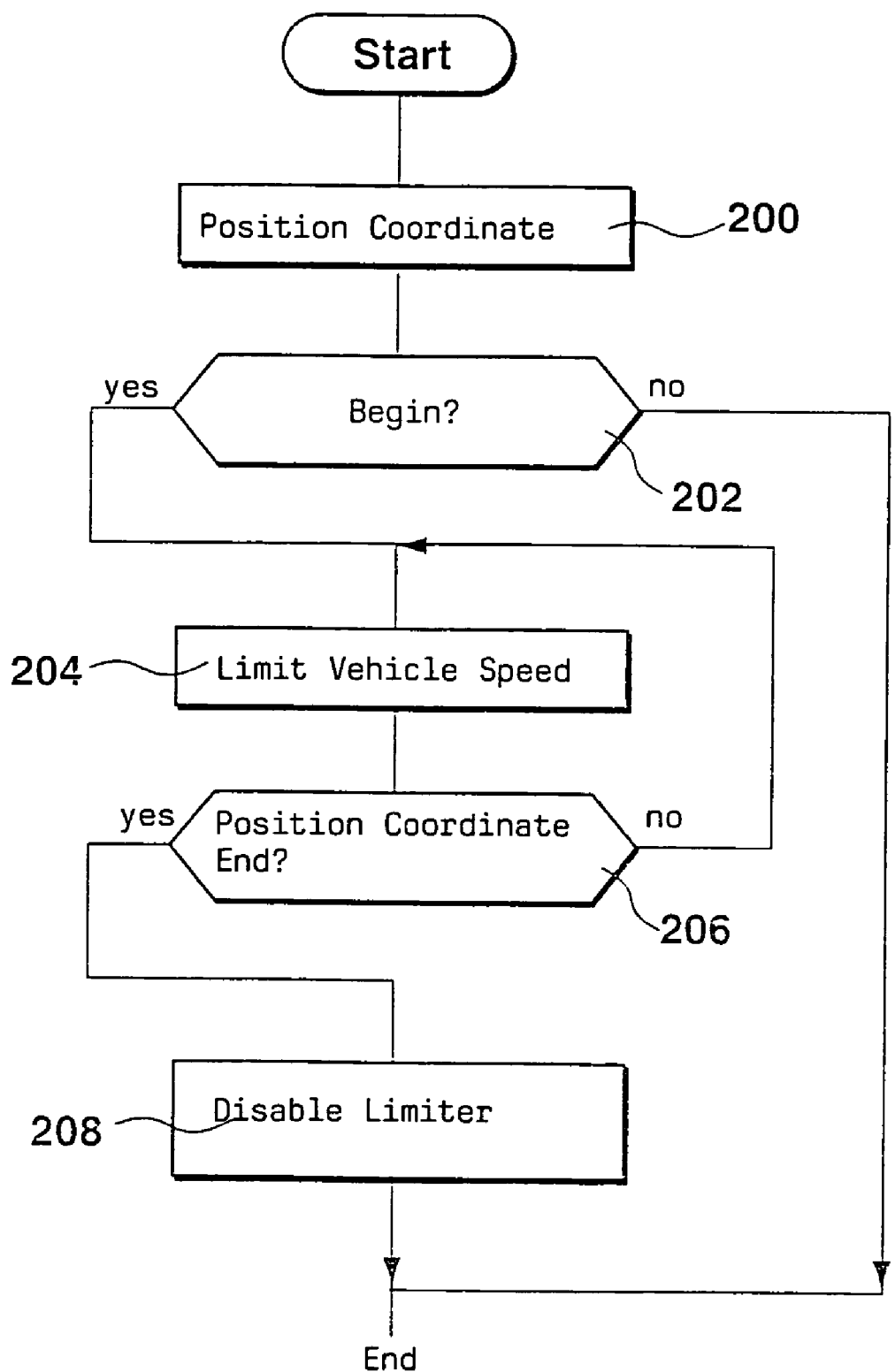

The preferred realization of the described procedure takes place in the context of software programs. Such a realization possibility is illustrated based on the sequence diagrams of FIGS. 2 and 3. FIG. 2 describes the procedure for programming in a preferred embodiment while FIG. 3 shows the procedure of limiting when again traveling over the programmed driving path.

If the driver wants the programming of the travel path lying ahead for speed limiting, then the driver starts the programming operation by actuating a provided operator-controlled element or by a comparable control command. This leads to the start of the programming program (see FIG. 2). According to step 100, the instantaneous position coordinate at which the vehicle is located is read in and is stored as the start of the travel distance for which the vehicle limiting is intended. In the next step 102, the instantaneous vehicle speed is stored as the limit speed. In a preferred embodiment, for a deceleration of the vehicle at the start of the programming operation, this storage operation is only undertaken when the deceleration phase is completed. In one embodiment, the speed limiting is already carried out during the programming of the travel path.

In the preferred embodiment, the storage of the position coordinate takes place by actuating a specially provided operator-controlled element or by actuating an available operator-controlled element assigned to another function in a specific manner, for example, via a pressing of the operator-controlled element over a longer time span.

In the next step 104, a check is made as to whether the programming operation is completed. If this is not the case, then the system remains in the programming mode. If the driver has indicated by a corresponding actuation of the one or other operator-controlled element (for example, a kickdown actuation of the accelerator pedal) that the travel path on which the speed limiting is to be automatically undertaken is ended, then, in step 106, the then present position coordinate is read in and stored. Thereafter, the program mode is ended. The travel path on which the limiting of the speed is intended to take place is therefore characterized by a position coordinate or comparable information with respect to the beginning and end of the travel distance. As mentioned above, the driving direction of the vehicle is considered in a preferred embodiment and is stored as an identifier together with the position coordinates. A termination of the programming operation without storage of an end coordinate while erasing the beginning position coordinate takes place when the driver interrupts the programming operation (key actuation) or parks the vehicle.

FIG. 3 shows the procedure for limiting the speed in dependence upon the travel path programmed as described above. This function too is carried out in one of the above-mentioned control units.

The program is run through at pregiven time points. First, in step 200, the instantaneous position coordinate of the vehicle is read in. In addition, in the preferred embodiment, the traveling direction is determined. Thereafter, in step 202, the instantaneous data are compared to the stored data for a speed-limiting travel path. If the instantaneous position coordinate and, if required, the travel direction in the context of the provided tolerances corresponds to the begin position coordinate and, if required, the travel direction identifier, then a travel speed limiting is initiated. Otherwise, the program is ended and the program is run through at the next time point. If, in step 202, the beginning of a travel path is therefore recognized, on which the vehicle speed is to be limited, then, in step 204, the limiting of the vehicle speed to the stored limit value is undertaken in the context of at least one known procedure. In the next step 206, the instantaneous position coordinate is read in anew and compared to the end position coordinate. If the end position coordinate is not yet reached, then the limiting is continued in accordance with step 204. If, in the context of the provided tolerances, the position coordinate (which identifies the end of the travel path) is reached in the context of the pregiven tolerance, then, according to step 208, the limiting is disabled and vehicle speeds greater than the limit speed are permitted. In step 208, the program is ended and is run through anew at the next time point.

Supplementally or alternatively, possible connecting paths between the beginning coordinate and the end coordinate are determined on the basis of the navigation system. If the actually driven path deviates from this path or this pregiven trajectory (path course), for example, by a turning of the vehicle, the limiting or the vehicle intervention is ended. In another embodiment, in addition to the beginning and end, the traveled trajectory is stored during the programming and the influencing of the vehicle is ended when there is a movement away from the trajectory. When the vehicle turns into the pregiven (programmed-in) trajectory, the speed limiting is activated when the traveling of this trajectory is started.

What is claimed is:

1. A method for influencing a vehicle in dependence upon travel paths, comprising the steps of:
   individually programming a travel path on which a pregiven influencing of the vehicle is to take place;
   causing the pregiven influencing of the vehicle to take place when the programmed travel path is again driven over;
   detecting a travel direction of the vehicle and storing said travel direction with said travel path during said programming of the travel path; and,
   causing the pregiven influencing of the vehicle to occur in dependence of said stored travel direction when the programed travel path is again driven over.

2. The method of claim 1, wherein the driver inputs a position coordinate for the beginning of the travel path by means of an operator-controlled element and inputs a position coordinate for the end of the travel path.

3. The method of claim 2, wherein the driver inputs the course of the travel path.

4. The method of claim 1, wherein the pregiven influencing of the vehicle includes: a limiting of speed, the switching in or switching out of at least one additional function and/or the enablement of predetermined intervention possibilities from the outside.

5. The method of claim 4, wherein a vehicle limit speed is stored together with the position coordinates and/or the path course.

6. The method of claim 1, wherein the programming is inputted by the driver: when actually driving the travel path or for virtually driving over on an image screen of a navigation system or externally in combination with a navigation system.

7. The method of claim 1, wherein an automatic influencing of the vehicle can be switched on and switched off.

8. The method of claim 1, wherein data sets as to travel paths are pregiven, which data sets are preprogrammed by means of a data carrier and for which travel paths an automatic vehicle influencing takes place.

9. The method of claim 1, wherein a preprogrammed travel path is subsequently erasable via a virtual traveling of the path or via an actual traveling of the path.

10. The method of claim 1, wherein the speed limiting is disabled during traveling of the travel path when the driver actuates the accelerator pedal.

11. The method of claim 1, wherein a preprogrammed travel path is subsequently erased via a virtual traveling of the path or via an actual traveling of the path.

12. A method for influencing a vehicle in dependence upon travel paths, comprising the steps of:

individually programming a travel path on which a pregiven influencing of the vehicle is to take place; and, causing the pregiven influencing of the vehicle to take place when the programmed travel path is again driven over, wherein the reaction time of the driver is considered when programming the travel path.

13. An arrangement for influencing a vehicle in dependence upon travel paths, the arrangement comprising:

a control unit which includes at least a microcomputer on which a program runs for the individual programming of a pregiven travel path;

a program for triggering an automatic influencing of the vehicle when again driving over said travel path;

said programs being set up so that during the individual programming of a pregiven travel path a travel direction of the vehicle is detected and stored; and wherein, when the programed travel path is again driven over, a pregiven influencing of the vehicle occurs automatically in dependence of said stored travel direction.

* * * * *